United States Patent
Nakajima

(10) Patent No.: US 8,340,500 B2
(45) Date of Patent: Dec. 25, 2012

(54) VIDEO SIGNAL RECORDING APPARATUS

(75) Inventor: Hirofumi Nakajima, Chigasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 1632 days.

(21) Appl. No.: 11/467,435

(22) Filed: Aug. 25, 2006

(65) Prior Publication Data

US 2007/0053661 A1    Mar. 8, 2007

(30) Foreign Application Priority Data

Sep. 7, 2005  (JP) ................. 2005-259461
Sep. 7, 2005  (JP) ................. 2005-259533
Sep. 7, 2005  (JP) ................. 2005-259534

(51) Int. Cl.
*H04N 5/94* (2006.01)

(52) U.S. Cl. ................. 386/263; 386/278

(58) Field of Classification Search .......... None
See application file for complete search history.

(56) References Cited

U.S. PATENT DOCUMENTS

| | | | |
|---|---|---|---|
| 5,430,489 A * | 7/1995 | Richards et al. | 348/446 |
| 6,560,401 B1 | 5/2003 | Higurashi et al. | |
| 2004/0130619 A1 * | 7/2004 | Lin | 348/96 |
| 2005/0044489 A1 * | 2/2005 | Yamagami et al. | 715/517 |
| 2005/0157798 A1 | 7/2005 | Nozawa | |
| 2006/0045469 A1 * | 3/2006 | Matsui et al. | 386/52 |

FOREIGN PATENT DOCUMENTS

| JP | 2000-134568 A | 5/2000 |
|---|---|---|
| JP | 2005-176330 A | 6/2005 |

* cited by examiner

*Primary Examiner* — William C Vaughn, Jr.
*Assistant Examiner* — Eileen Adams
(74) *Attorney, Agent, or Firm* — Canon USA, Inc., IP Division

(57) ABSTRACT

To perform a seamless recording on a tape recording medium, additional information included in a predetermined unit of data in recording data is detected. An editing point for the seamless recording is determined based on information indicating at least presence of an editing point where the seamless recording can be performed, field order, and presence/absence of a repeat field included in the additional information. The seamless recording is performed from a position based on the determined editing point.

5 Claims, 17 Drawing Sheets

FIG.2
PRIOR ART 24p
(2-3 PULL DOWN)

| T B | T B | T B | T B | T B | T B | T B | T B | T B | T B | T B | T B | T B | T B | T B |
|---|---|---|---|---|---|---|---|---|---|---|---|---|---|---|
| 3 | 2 | 3 | 2 | 3 | 2 | 3 | 2 | 3 | 2 | 3 | 2 | | | |

60i or 30p

| T B | T B | T B | T B | T B | T B | T B | T B | T B | T B | T B | T B | T B | T B | T B |
|---|---|---|---|---|---|---|---|---|---|---|---|---|---|---|
| 2 | 2 | 2 | 2 | 2 | 2 | 2 | 2 | 2 | 2 | 2 | 2 | 2 | 2 | 2 |

SEAMLESS RECORDING NG (FIELD ORDER ERROR)

SEAMLESS RECORDING NG (FIELD ORDER ERROR)

SEAMLESS RECORDING NG (TIME STAMP CONTINUITY ERROR)

SEAMLESS RECORDING OK

LAST FRAME OF 24p RECORDING

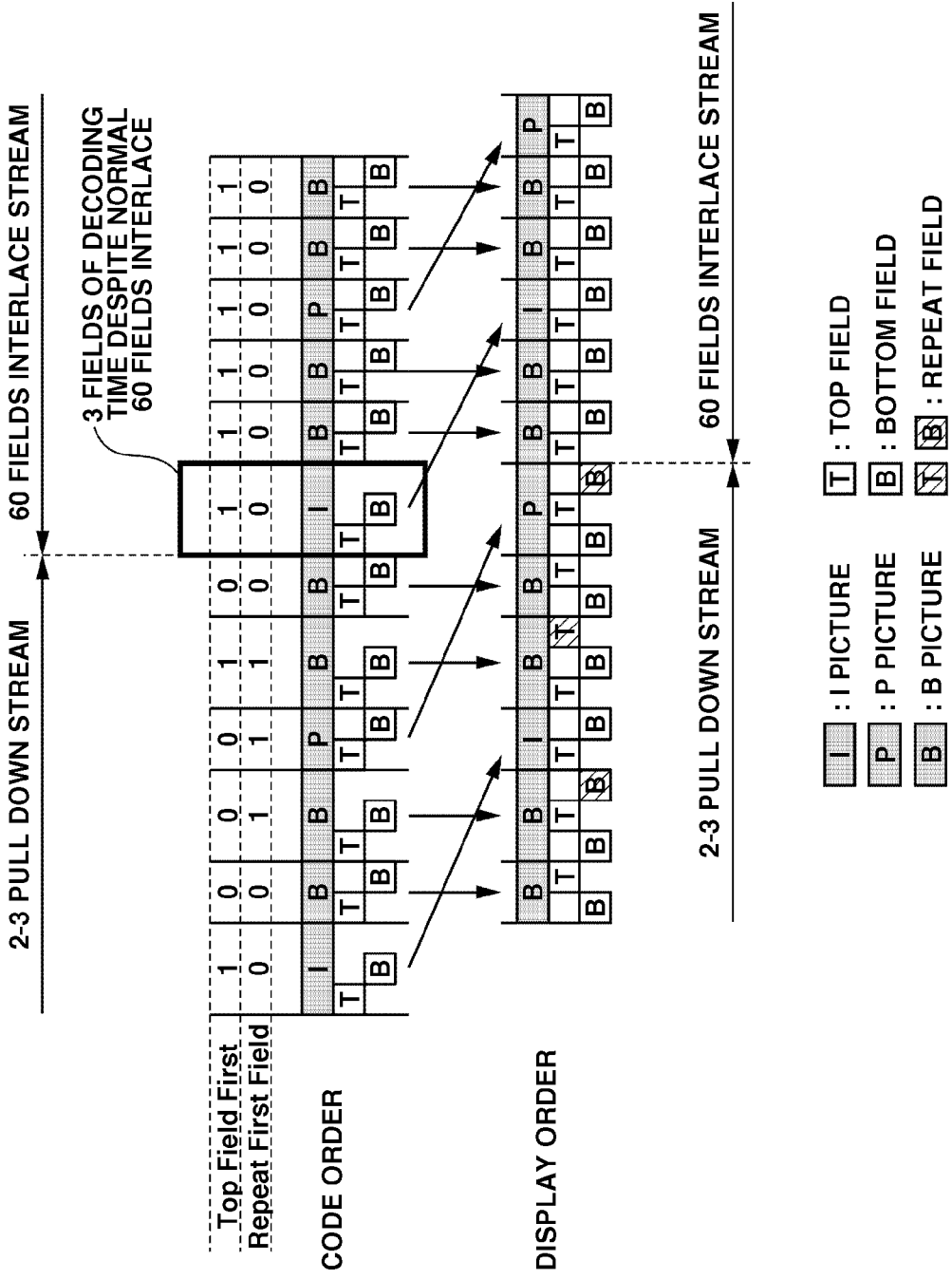

VIDEO SIGNAL RECORDING APPARATUS

BACKGROUND OF THE INVENTION

1. Field of the Invention

The present invention relates to a video signal recording apparatus that records a compressed and encoded video signal on a recording medium.

2. Description of the Related Art

In recent years, camera-integrated video tape recorders (VTRs) that can record and reproduce high definition (HD) video signals have been commercially produced. The HD camera-integrated VTR has adopted MPEG (Moving Pictures Experts Group)-2 as a compression and encoding technique for a video signal. Then, compressed and encoded bit streams are recorded on a magnetic tape in a recording format in which an error correction code generation unit (also referred to as an ECC unit) is used as a minimum unit of recording.

A conventional technique for the seamless recording of data recorded on a magnetic tape is known. When re-recording new data on a recorded tape is performed, since error correction code is generated in the minimum unit of recording, re-recording is performed after reproducing data from the recorded tape and detecting the minimum unit of recording including a frame switching point (Japanese Patent Application Laid-Open No. 2000-134568).

According to the above conventional technique, a frame switching point within the minimum unit of recording reproduced from the recorded tape is detected and then new data is re-recorded from the frame switching point. However, a structure of the above conventional technique shows that only a frame switching point is detected and neither information indicating a field of a first frame in display order at the frame switching point nor information indicating presence/absence of any redundant repeat field is referenced. This can cause such problems (1) and (2) as shown below:

If data recorded on a magnetic tape is 24 frames progressive (24p) video, (1): fields of the same kind may appear successively depending on a frames for connection, thus resulting in a field order error, and (2): decoding time, which normally does not occur, may occur at an editing point.

The aforementioned problems will now be described in detail below. FIG. 2 shows a state when a 24p video signal is recorded on a magnetic tape and also a state when a 60 fields interlace (60i) or 30 frames progressive (30p) video signal is recorded on a magnetic tape.

Here, since film footage transmits 24 frames/second while a video signal (NTSC system) recorded on a magnetic tape transmits 30 frames/second (60 fields/second), field number conversion is performed for a 24p recording by a 2-3 pull down.

The 2-3 pull down is a technique, as shown concretely in FIG. 3, that performs the 24p field number conversion by inserting a redundant repeat field (repeat field) for every other frame. The video signal obtained by performing the 2-3 pull down is characterized in that a frame beginning with a top field and a frame beginning with a bottom field appear alternately for every two frames because a repeat field is inserted for every other frame.

When a normal 60i or 30p video signal is recorded, as shown in FIG. 2, all frames begin with a top field because two continuous fields beginning with a top field are normally encoded as a frame.

Therefore, when an MPEG-encoded 60i video signal is newly recorded on a tape on which a video signal subjected to the 2-3 pull down and MPEG encoding was recorded, a field order error in which top fields appear successively may occur depending on a frame position for connection. FIGS. 4A and 4B show examples in which a field order error occurs, and FIGS. 5A and 5B show the details thereof. In these cases, such a frame position is inappropriate as an editing point for a seamless recording.

In addition, since there is no specification regarding the repeat field, in an example shown in FIG. 4C, decoding time, which normally does not occur, occurs at an editing point. FIG. 6 shows an enlarged view of the example of FIG. 4C in code order. As is apparent from FIG. 6, abnormal decoding time is caused when the example of FIG. 4C is rearranged in code order.

That is, if a video signal recorded on a magnetic tape is 24p and a 60i video signal is seamlessly recorded, FIG. 4D is an only example in which a seamless recording can be made. However, the conventional technique does not provide a method for detecting an editing point where a normal seamless recording can be performed.

SUMMARY OF THE INVENTION

The present invention has been made in view of the above problem and is directed to a video signal recording apparatus that can easily detect an editing point where a normal seamless recording can be performed and can generate stream data that can be continuously decoded by the seamless recording even if recording is performed on a recording medium on which, for example, a 24p video signal was recorded.

The present invention is further directed to a video signal recording apparatus which can perform a seamless recording in accordance with a detection result of the editing point. The present invention is further directed to a video signal recording apparatus which can detect an editing point appropriate for a seamless recording.

According to an aspect of the present invention, a video signal recording apparatus configured to record, on a tape-shaped recording medium, unit data obtained by unitizing stream data based on an error correction processing unit, includes: a recording unit configured to record the unit data on the recording medium; a detecting unit configured to detect additional information included in the unit data recorded on the recording medium; an analyzing unit configured to analyze the additional information detected by the detecting unit and obtain information indicating at least presence of an editing point where the seamless recording can be performed, field order, and presence/absence of a repeat field; and a seamless recording control unit configured to control a seamless recording for recording, on the recording medium on which unit data including first stream data was recorded, unit data including second stream data, wherein, when performing the seamless recording, the seamless recording control unit determines an editing point for the seamless recording based on the information obtained by the analyzing unit in relation to the unit data including the first stream data, generates unit data allowing the second stream data to be recorded from a position based on the determined editing point, and causes the recording unit to record the generated unit data.

According to another aspect of the present invention, a video signal recording apparatus configured to record, on a tape-shaped recording medium, unit data obtained by unitizing stream data based on an error correction processing unit, includes: a recording unit configured to record the unit data on the recording medium; a detecting unit configured to detect, from unit data recorded on the recording medium, an editing point where a seamless recording can be performed; an analyzing unit configured to analyze information on field order and presence/absence of a repeat field related to the editing point detected by the detecting unit; a first determining unit configured to determine whether stream data related to the editing point detected by the detecting unit is in a 24 frames/second progressive mode; a second determining unit configured to determine whether stream data to be newly recorded is in the 24 frames/second progressive mode; and a seamless recording control unit configured to, when a determination result by the first determining unit indicates the 24 frames/second progressive mode and a determination result by the second determining unit indicates not the 24 frames/second progressive mode, determine whether to perform the seamless recording to record the stream data to be newly recorded from a position based on the editing point detected by the detecting unit based on the information analyzed by the analyzing unit.

According to yet another aspect of the present invention, a video signal recording apparatus configured to record, on a tape-shaped recording medium, unit data obtained by unitizing stream data based on an error correction processing unit, includes: a recording unit configured to record the unit data on the recording medium; a detecting unit configured to detect, from unit data recorded on the recording medium, an editing point where a seamless recording can be performed; an analyzing unit configured to analyze information on field order and presence/absence of a repeat field related to the editing point detected by the detecting unit; a first determining unit configured to determine whether stream data related to the editing point detected by the detecting unit is in a 24 frames/second progressive mode; a second determining unit configured to determine whether stream data to be newly recorded is in the 24 frames/second progressive mode; and a seamless recording control unit configured to, when a determination result by the first determining unit indicates the 24 frames/second progressive mode and a determination result by the second determining unit indicates not the 24 frames/second progressive mode, determine whether to confirm the editing point detected by the detecting unit as an editing point for the seamless recording based on the information analyzed by the analyzing unit, and if not confirming, control the detecting unit to detect a next editing point.

According to yet another aspect of the present invention, a video signal recording apparatus configured to record, on a tape-shaped recording medium, unit data obtained by unitizing stream data based on an error correction processing unit, includes: a recording unit configured to record the unit data on the recording medium; a detecting unit configured to detect, from unit data recorded on the recording medium, an editing point where a seamless recording can be performed; an analyzing unit configured to analyze information on field order and presence/absence of a repeat field related to the editing point detected by the detecting unit; a first determining unit configured to determine whether stream data related to the editing point detected by the detecting unit is in a 24 frames/second progressive mode; a second determining unit configured to determine whether stream data to be newly recorded is in the 24 frames/second progressive mode; and a seamless recording control unit configured to, when a determination result by the first determining unit indicates the 24 frames/second progressive mode and a determination result by the second determining unit indicates not the 24 frames/second progressive mode, determine whether to perform the seamless recording to record the stream data to be newly recorded from a position based on the editing point detected by the detecting unit based on the information analyzed by the analyzing unit or to perform a discontinuous recording to insert invalid data.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments, features and aspects of the present invention and, together with the description, serve to explain the principles of the invention.

FIG. 2 is a diagram showing a state when a 24p video signal and a 60i or 30p video signal are recorded on a magnetic tape.

FIG. 6 is a diagram illustrating a case where abnormal decoding time occurs.

DETAILED DESCRIPTION OF THE EMBODIMENTS

Exemplary embodiments, features and aspects of the present invention will now herein be described in detail below with reference to the drawings.

First Exemplary Embodiment

Figure 1:
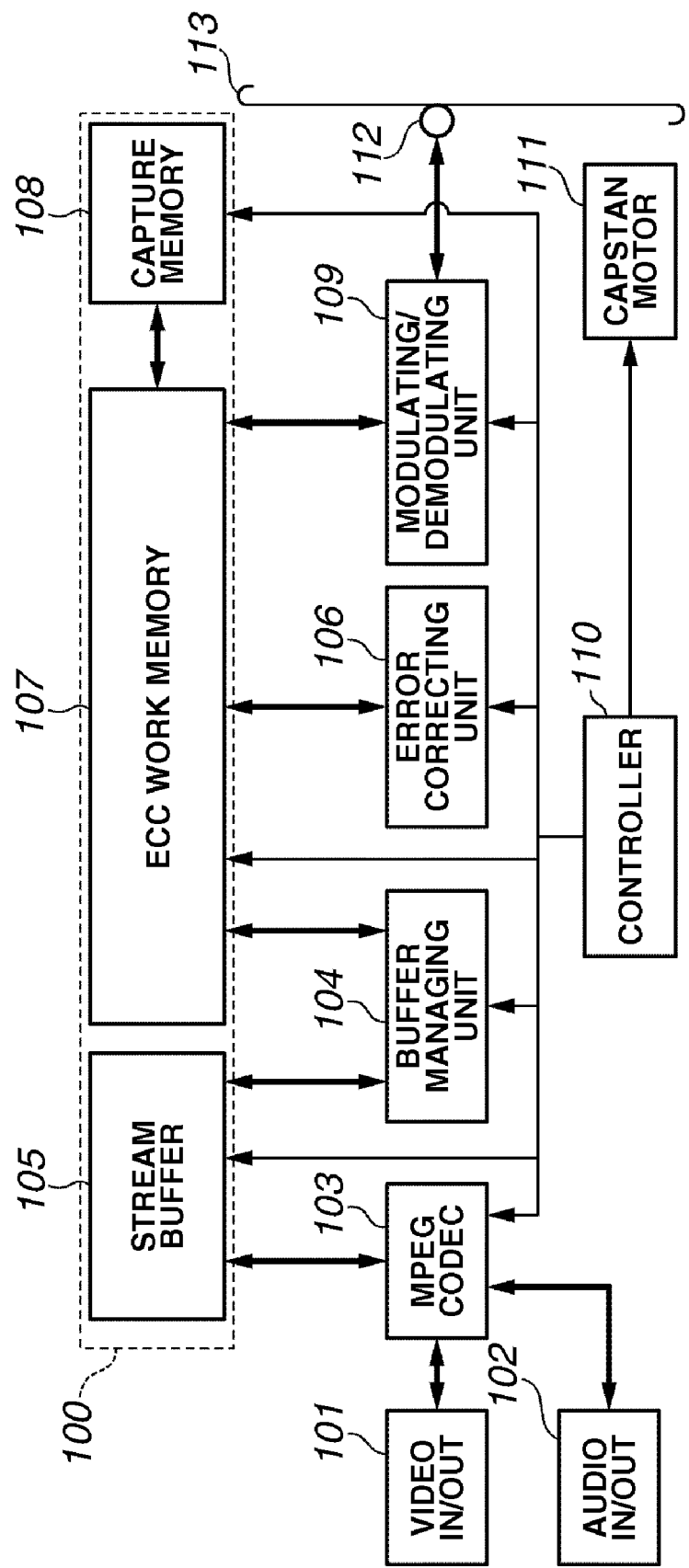
FIG. 1 is a block diagram of a video signal recording apparatus according to a first exemplary embodiment of the present invention.
Figure 3:
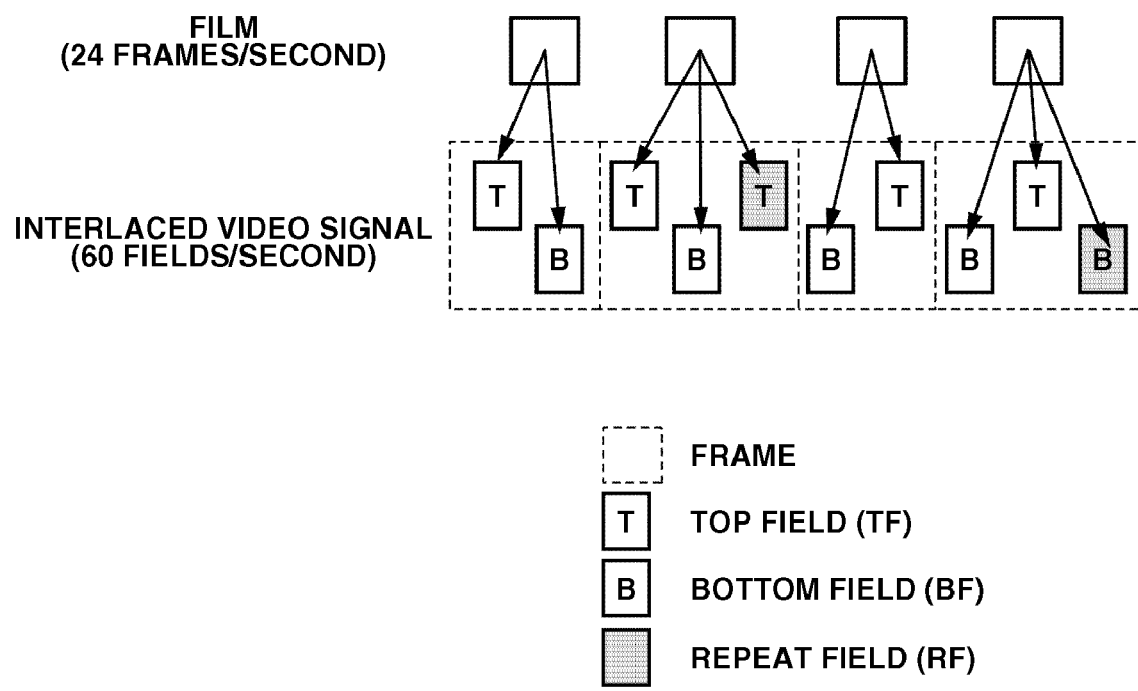
FIG. 3 is a diagram illustrating the 2-3 pull down.

FIG. 1 is a block diagram of an example of a configuration of a video signal recording apparatus according to an exemplary embodiment of the present invention. Such a recording apparatus is applicable to a camera-integrated video recorders or the like. In FIG. 1, a memory unit 100 such as an SDRAM is configured to be able to store multiple types of data. Reference numeral 101 denotes a VIDEO IN/OUT terminal for input/output of a video signal, and reference numeral 102 denotes an AUDIO IN/OUT terminal for input/output of an audio signal. An MPEG codec (coder/decoder) 103 compresses and decompresses the video signal and audio signal. For the purpose of simplifying description, the video signal is assumed to include the audio signal in the description below.

A stream buffer 105 accumulates MPEG-compressed video signals (MPEG stream), and a buffer managing unit 104 controls writing/reading of the stream buffer 105. The buffer managing unit 104 transmits the MPEG stream between the stream buffer 105 and an ECC work memory 107. An error correcting unit 106 performs error correction processing for the MPEG stream using the ECC work memory 107.

A capture memory 108 stores data of an ECC unit including an editing point. A modulating/demodulating unit 109 modulates/demodulates analog signals when recording/reproducing ECC unit data including the MPEG stream on/from a magnetic tape. A controller 110 controls an operation of each block in accordance with instructions from an operation unit (not shown). A capstan motor 111 drives a magnetic tape 113 in accordance with control from the controller 110. Reference numeral 112 denotes a recording/reproducing head, and the magnetic tape 113 is a recording medium.

Referring to FIG. 1, exemplary operation of the video signal recording apparatus to reproduce a video signal recorded on the magnetic tape 113 will be described. The capstan motor 111 is controlled in accordance with the reproduction control of the controller 110 to cause the magnetic tape 113 to run. Then, an analog signal is extracted from the running magnetic tape 113 by the recording/reproducing head 112 mounted on a rotating drum. The extracted analog signal is demodulated by the modulating/demodulating unit 109 into original digital data, which is then stored in the ECC work memory 107.

If data accumulated in the ECC work memory 107 reaches the amount of data for the minimum unit of recording, that is, the ECC unit, the error correcting unit 106 acquires data for the ECC unit from the ECC work memory 107, performs error correction processing, and performs processing to write the data back to the ECC work memory 107. The buffer managing unit 104 transfers the data for the ECC unit written back to the ECC work memory 107 after the error correction processing by the error correcting unit 106 to the stream buffer 105. Such processing is repeated sequentially for data for plural ECC units to be reproduced.

Data, that is, the MPEG stream, accumulated in the stream buffer 105 is read and decoded by the MPEG codec 103. Then, the data is output to the VIDEO IN/OUT terminal 101 and the AUDIO IN/OUT terminal 102.

Next, an exemplary recording operation will be described below. Video and audio signals input from the VIDEO IN/OUT terminal 101 and the AUDIO IN/OUT terminal 102 are encoded by the MPEG codec 103 in accordance with recording control of the controller 110, and then an MPEG stream is accumulated in the stream buffer 105.

When data for an ECC unit is accumulated in the stream buffer 105, the buffer managing unit 104 transfers the data for the ECC unit to the ECC work memory 107. When the data for the ECC unit is accumulated in the ECC work memory 107, the error correcting unit 106 acquires the data for the ECC unit from the ECC work memory 107, performs processing for error correction, and writes the data back to the ECC work memory 107. Such processing is repeated sequentially for data for plural ECC units to be recorded.

Data processed by the error correcting unit 106 and accumulated in the ECC work memory 107 is read by the modulating/demodulating unit 109, modulated to an analog signal for recording, and recorded on the magnetic tape 113 by the recording/reproducing head 112.

Figure 7:
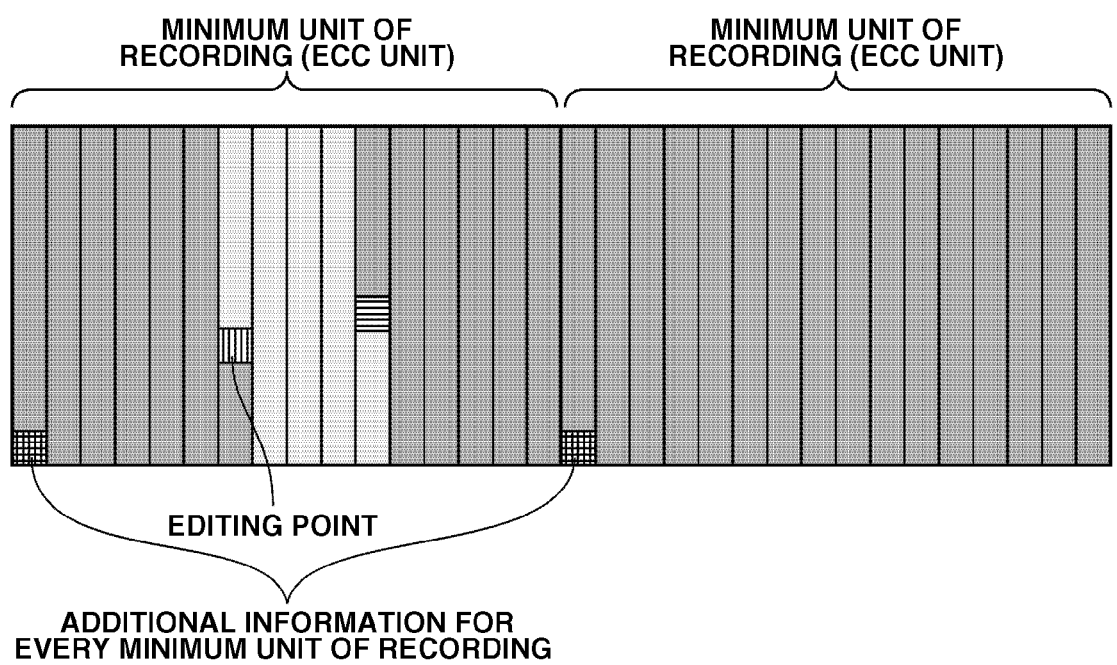
FIG. 7 is a diagram showing recording patterns on a magnetic tape.

FIG. 7 shows an example of the recording patterns on the magnetic tape 113 recorded by the video signal recording apparatus. In the example shown in FIG. 7, the minimum unit for recording is 16 tracks, and data in the minimum unit of recording including 16 tracks, that is, for an ECC unit, is recorded continuously on the magnetic tape. Additional information exists in a top part of each ECC unit. An editing point shown in FIG. 7 indicates a point at which a new recording can be started.

Figure 8:
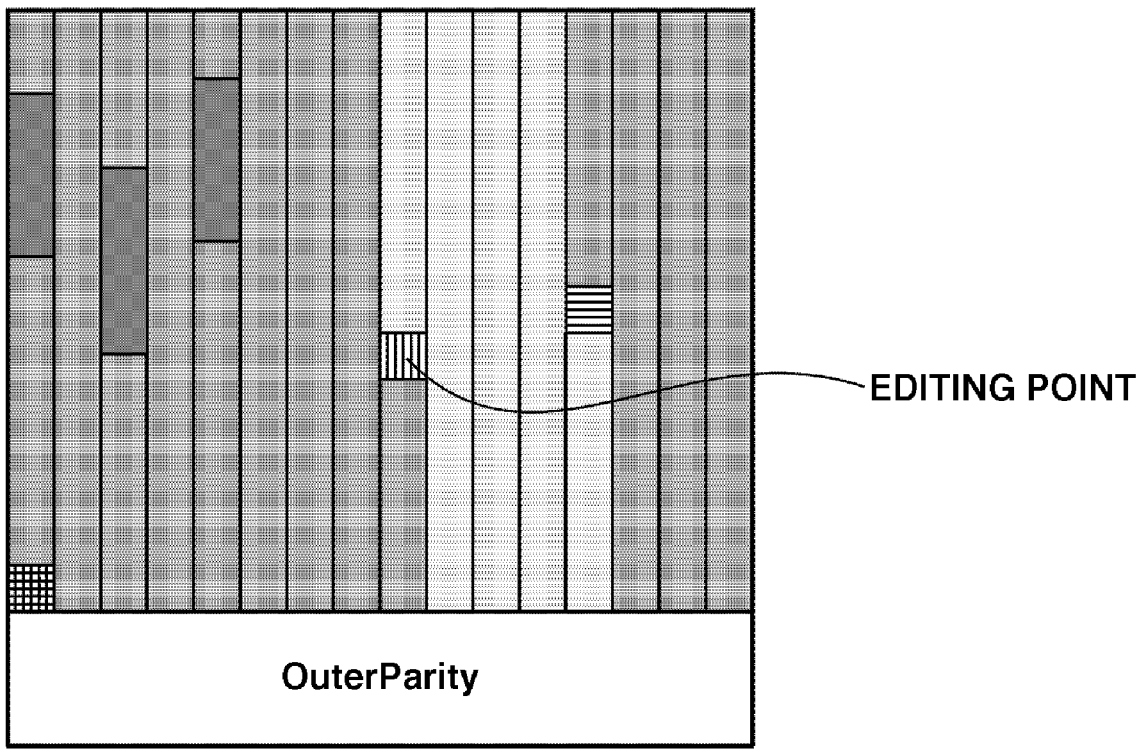
FIG. 8 is a diagram showing a structure of an ECC unit (data for 16 tracks) recorded on a magnetic tape.

FIG. 8 is a diagram showing the structure of the ECC unit (data for 16 tracks) recorded on the magnetic tape. Outer parity shown in FIG. 8 is attached to data recorded on the magnetic tape in units of 16 tracks, which is the minimum unit of recording. By performing error correction for every ECC unit, whether there is any error is determined in units of ECC units. Therefore, the ECC unit becomes the minimum unit of recording.

As shown in FIG. 8, video data, audio data, and search data are stored within an ECC unit according to predetermined rules. Additional information (system data) indicating various kinds of information in the ECC unit is provided within the ECC unit. Information indicating whether there is any editing point within the ECC unit and information indicating a position (a track number and a sync block number, which will be described later) of an editing point within the ECC unit are written into the system data. Moreover, in relation to pictures recorded after the editing point, DTS (decoding time stamp), a VBV_Delay value (indicating a time during which a picture remains within a VBV buffer for decoding), information about a coding mode such as 24p and 30p, a field parity of the first frame in display order indicating top field first or bottom field first, and information indicating whether there is any redundant repeat field of the first frame in display order are also written into the system data.

Figure 9:
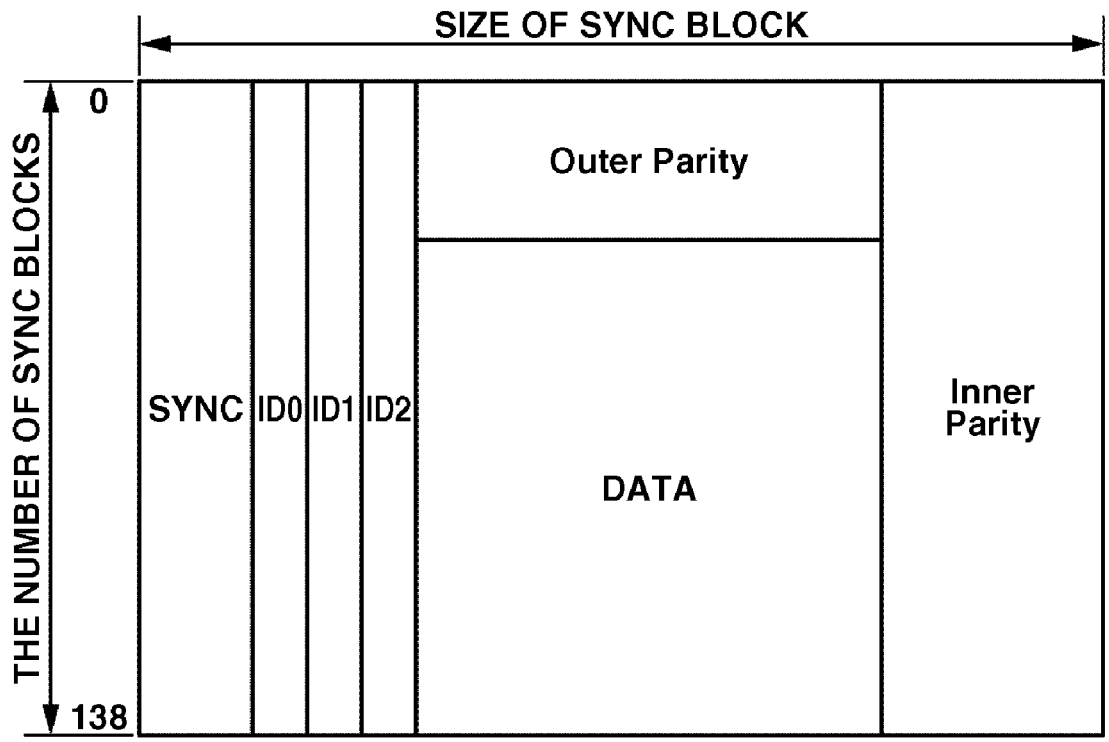
FIG. 9 is a diagram showing the structure of data in each track in FIG. 8.

FIG. 9 is a diagram showing the configuration of data within each track in FIG. 8. Each track includes sync blocks 0 to 138. Each sync block includes data SYNC, ID0, ID1, ID2, Outer Parity or DATA, and Inner Parity. Then, data ID0 to ID2 contain a track pair number indicating a track position within the ECC unit and a sync block number indicating a sync block position within a track. The error correcting unit 106 uses data Outer Parity and Inner Parity within the track to perform error detection and correction in units of ECC units.

Figure 10:
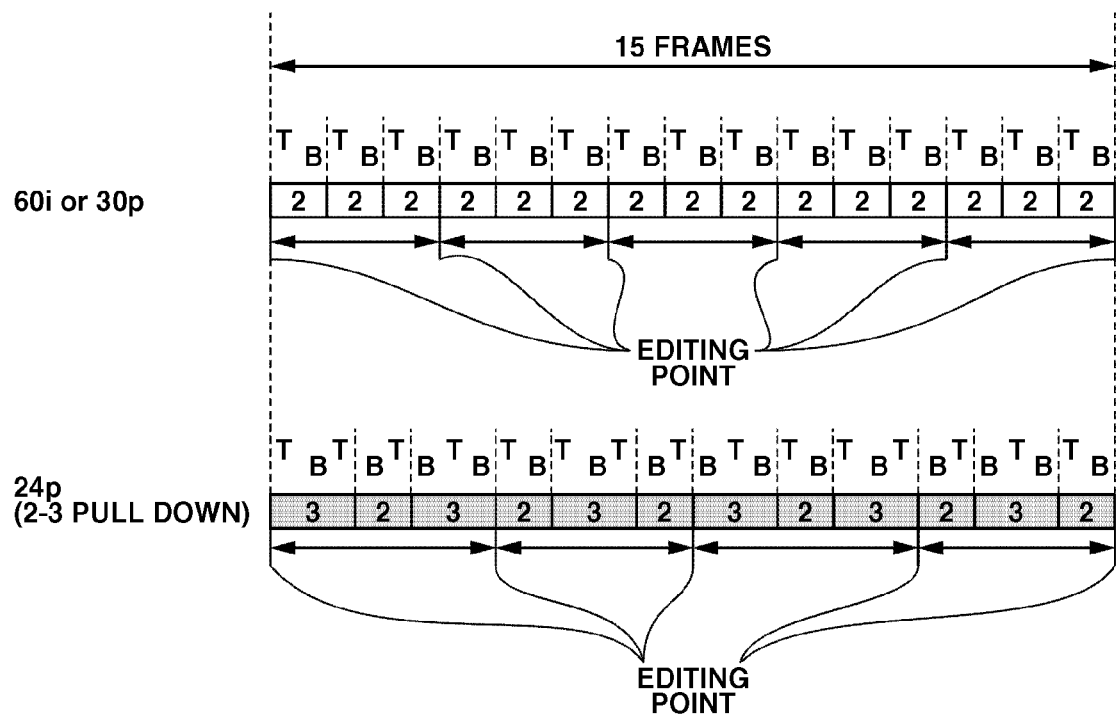
FIG. 10 illustrates an example in which signals are recorded by the video signal recording apparatus.

FIG. 10 is a diagram showing an example when a 60i or 30p video signal is input and recorded and an example in which a 2-3 pull down 24p video signal is input and recorded according to the recording operation by the video signal recording apparatus in the present embodiment.

In the examples in FIG. 10, in the case of an MPEG stream for the 60i or 30p recording, 15 frames are grouped to one GOP (Group Of Pictures), and an editing point is set for every three frames. For the 24p recording, on the other hand, the field number conversion by the 2-3 pull down is performed, and a repeat field is inserted for every other frame. Therefore, a data stream obtained by grouping 15 frames into one GOP after converting original 12 frames is created, and an editing point is set at intervals shown in FIG. 10.

Figure 11:
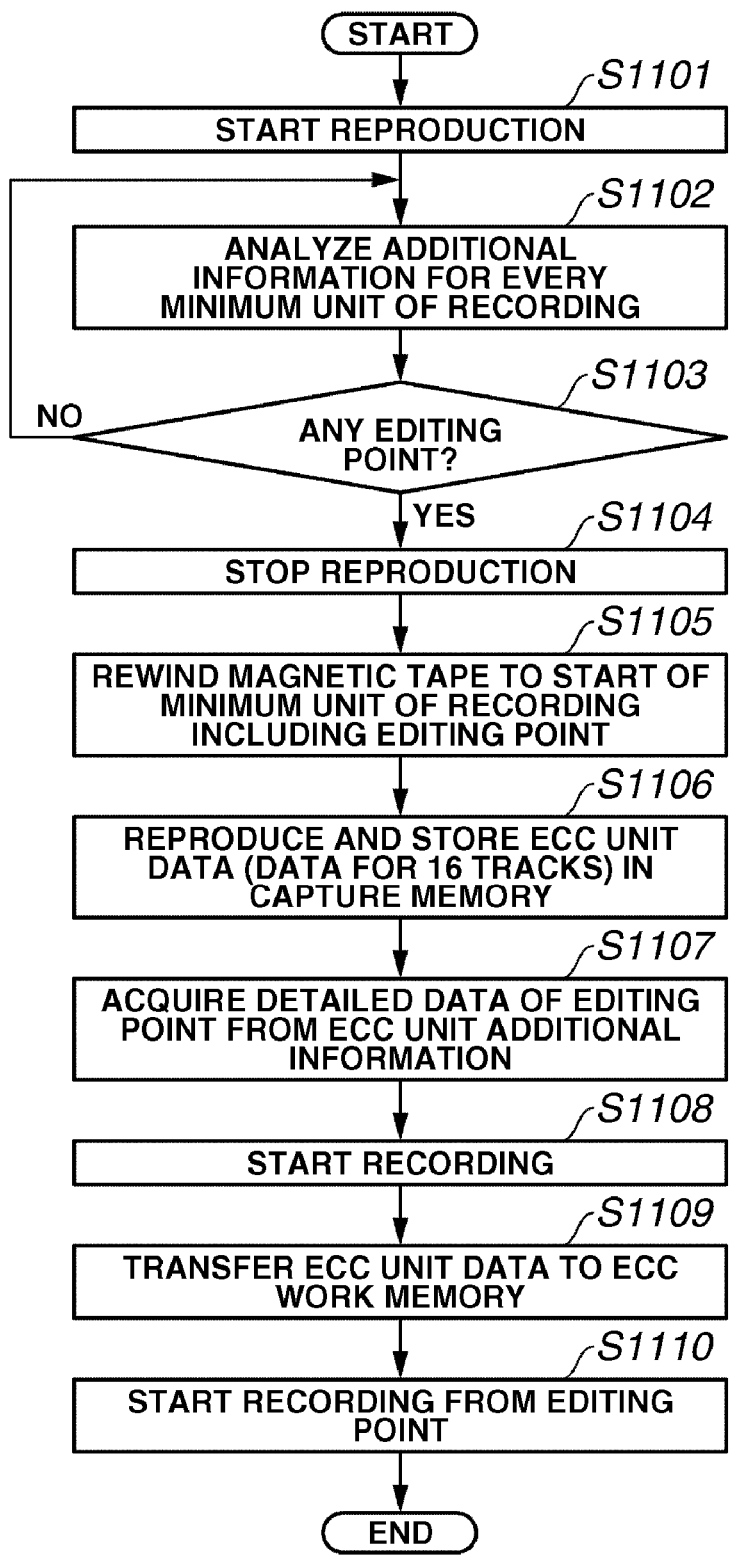
FIG. 11 is a flow chart illustrating a seamless recording according to the first embodiment of the present invention.

Referring to FIG. 11, an exemplary operation for a seamless recording to record new recording data on a recorded magnetic tape in the video signal recording apparatus in the present embodiment is described below. The flow chart in FIG. 11 illustrates an operation control sequence to be performed by the controller 110 (see also FIG. 1).

When the operation for a seamless recording is started, the reproduction is performed (S1101) to search for an editing point from data recorded on the magnetic tape 113. The controller 110 acquires data whose errors have been corrected by the error correcting unit 106 from the ECC work memory 107 and analyzes additional information for every reproduced minimum unit of recording (ECC unit) (S1102). Then, if an editing point is found to be present as a result of analyzing the ECC unit additional information (Yes in step S1103), the procedure proceeds to step S1104, and if no editing point is found (No in step S1103), the procedure returns to step S1102. After returning to step S1102, a similar flow will be repeated for the minimum unit of recording (ECC unit) to be reproduced next.

If an editing point is present, the reproduction is stopped (S1104). Then, the magnetic tape 113 is rewound to a reproduction start position of the minimum unit of recording (ECC unit) including the editing point (S1105). Next, the reproduction is restarted to reproduce the ECC unit (data for 16 tracks) including the editing point, data thereof is transferred from the ECC work memory 107 to the capture memory 108, and the data is stored in the capture memory 108 (S1106). Then, the controller 110 reads the ECC unit additional information from data stored in the capture memory 108 to acquire data on the track number of the editing point within the ECC unit, sync block number, DTS, PTS, VBV buffer amount, field parity of the first frame in display order, presence/absence of a repeat field for the first frame in display order, and coding mode (S1107).

It is noted that Steps S1101 to S1107 may be performed automatically before an actual recording start instruction is given when, for example, a recorded magnetic tape is mounted on the video signal recording apparatus or a system of the recording apparatus is started by turning on the power. The recording is started in accordance with a recording instruction (S1108). Then, ECC unit data stored in the capture memory 108 is transferred to the ECC work memory 107 (S1109).

Similarly to the above described recording operation, a video signal to be input for a seamless recording is encoded by the MPEG codec 103 and accumulated in the stream buffer 105. The buffer managing unit 104 reads stream data accumulated in the stream buffer 105 and writes the stream data successively from the position corresponding to the track number and sync block number within the ECC unit stored in the ECC work memory 107 in step S1106. That is, a recording of new stream data starts from the editing point of the ECC unit within the ECC work memory 107 (S1110). Subsequently, recording data under goes processing for error correction by the error correcting unit 106 and modulation by the modulating/demodulating unit 109. The recording data is seamlessly recorded following the recorded data on the magnetic tape 113 by the recording/reproducing head 112.

Figure 12:
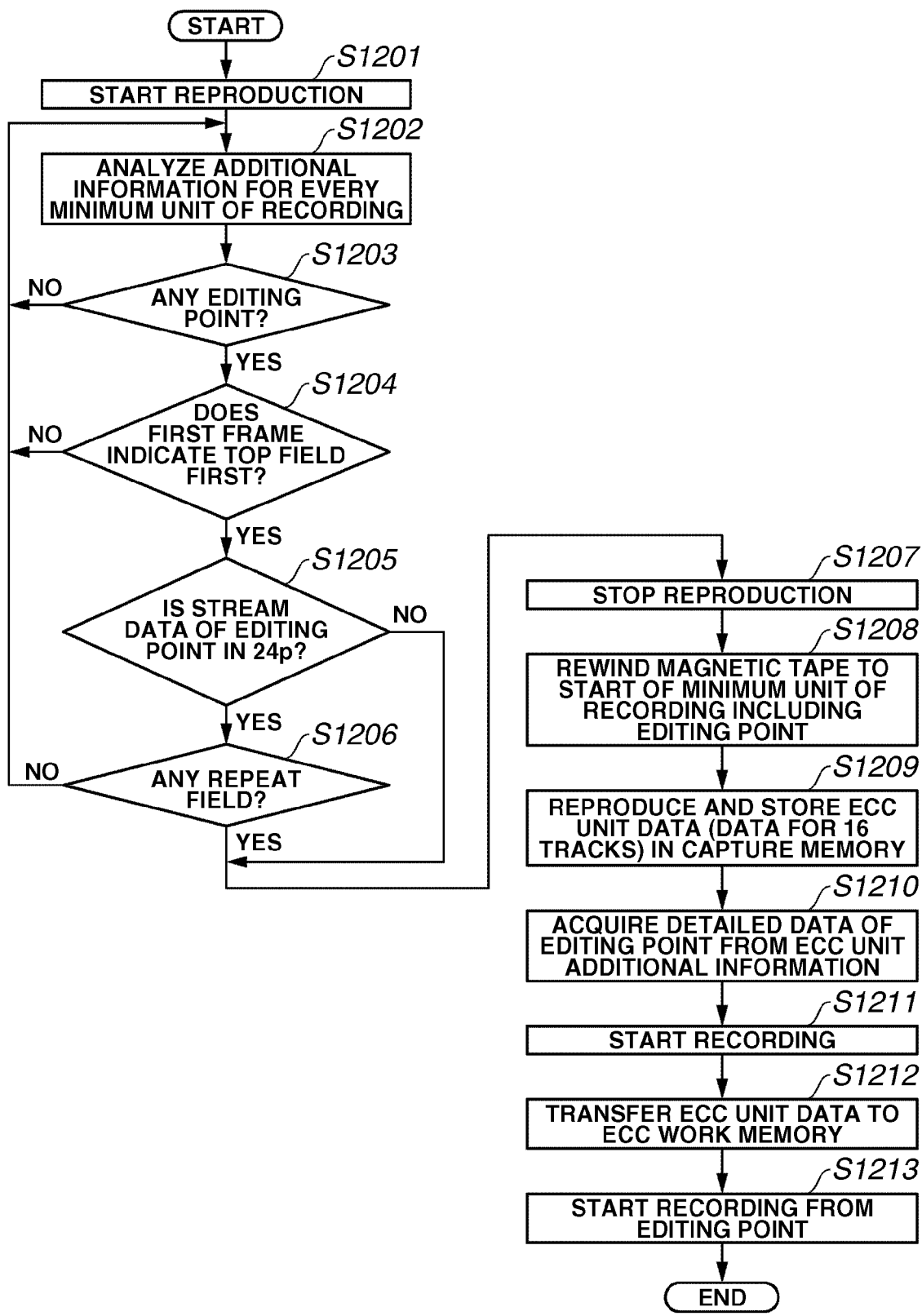
FIG. 12 is a flow chart illustrating another seamless recording according to the first embodiment of the present invention.

The present embodiment can also be implemented by changing the flow chart in FIG. 11 to that in FIG. 12. Referring to 12, the recording operation is described below. The flow chart in FIG. 12 illustrates an exemplary operation control sequence to be performed by the controller 110.

When the operation for a seamless recording is started, the reproduction is performed to search for an editing point from data recorded on the magnetic tape 113 (S1201). Next, the controller 110 acquires data whose errors have been corrected by the error correcting unit 106 from the ECC work memory 107 and analyzes additional information for every reproduced minimum unit of recording (ECC unit) (S1202). Then, if an editing point is found to be present as a result of analyzing the ECC unit additional information (Yes in step S1203), the procedure proceeds to step S1204 and if no editing point is found (No in step S1203), the procedure returns to step S1202.

If the first frame in display order after the editing point is found to be top field first as a result of analyzing the ECC unit additional information (Yes in step S1204), the procedure proceeds to step S1205. Otherwise (No in step S1204), the procedure returns to step S1202.

If stream data of the editing point is found to be 24p recording as a result of analyzing the ECC unit additional information (Yes in step S1205), the procedure proceeds to step S1206. Otherwise (No in step S1205) (60i or 30p), the procedure proceeds to step S1207.

If information indicating presence/absence of a repeat field for the first frame in display order after the editing point indicates presence of the repeat field as a result of analyzing the ECC unit additional information (Yes in step S1206), the procedure proceeds to step S1207. Otherwise (No in step S1206), the procedure returns to step S1202. After returning to step S1202, a similar flow will be repeated for the minimum unit (ECC unit) of recording (ECC unit) to be reproduced next.

Still referring to FIG. 12, the reproduction is stopped (S1207). Then, the magnetic tape 113 is rewound to a reproduction start position of the minimum unit of recording (ECC unit) including the editing point (S1208). The reproduction is restarted to reproduce the ECC unit (data for 16 tracks) including the editing point, data thereof is transferred from the ECC work memory 107 to the capture memory 108, and the data is stored in the capture memory 108 (S1209). Then, the controller 110 reads the ECC unit additional information from data stored in the capture memory 108 to acquire data on the track number of the editing point within the ECC unit, sync block number, DTS, PTS, and VBV buffer amount (S1210).

It is also noted that Steps S1201 to S1210 may be performed automatically before an actual recording start instruction is given when, for example, a recorded magnetic tape is mounted on the video signal recording apparatus or a system of the recording apparatus is started by turning on the power.

The recording is started in accordance with a recording instruction (S1211). Then, ECC unit data stored in the capture memory 108 is transferred to the ECC work memory 107 (S1212).

Similarly to the recording operation, a video signal to be input for a seamless recording is encoded by the MPEG codec 103 and accumulated in the stream buffer 105. The buffer managing unit 104 reads data accumulated in the stream buffer 105 and writes the data successively from the position corresponding to the track number and sync block number within the ECC unit stored in step S1209 within the ECC work memory 107. That is, a recording of new stream data starts from the editing point of the ECC unit within the ECC work memory 107 (S1213).

Subsequently, recording data undergoes processing for error correction by the error correcting unit 106 and modulation by the modulating/demodulating unit 109, and then is seamlessly recorded following the recorded data on the magnetic tape 113 by the recording/reproducing head 112.

Figure 4A:
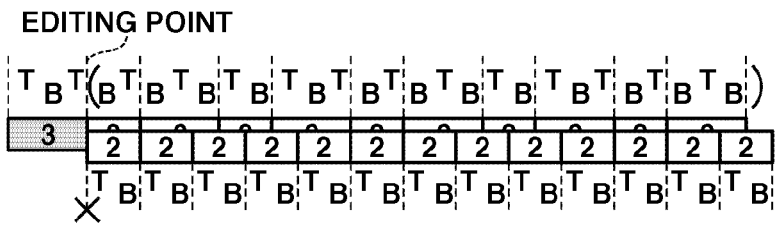
FIGS. 4A and 4B illustrate examples of editing points at which a seamless recording is impossible due to a field order error.
Figure 4B:
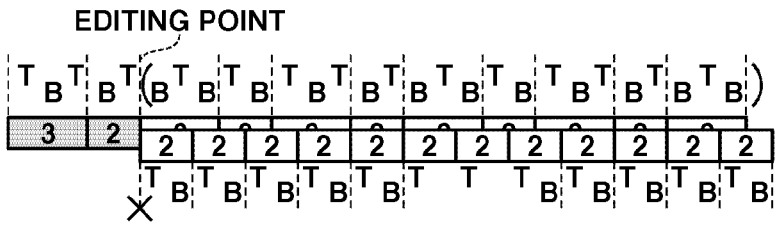
Figure 4C:
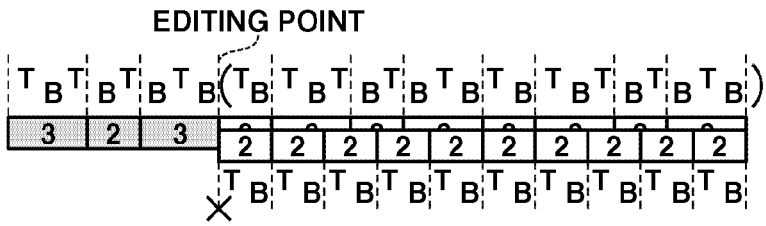
FIG. 4C illustrates an example of an editing point at which a seamless recording is impossible due to a time stamp continuity error.
Figure 4D:
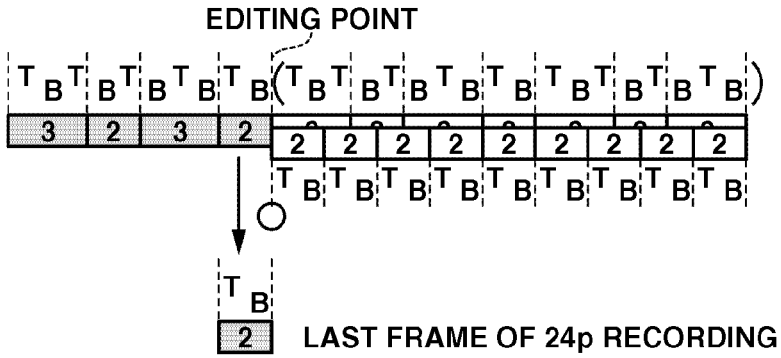
FIG. 4D illustrates an example of an editing point at which a normal seamless recording is possible.
Figure 5A:
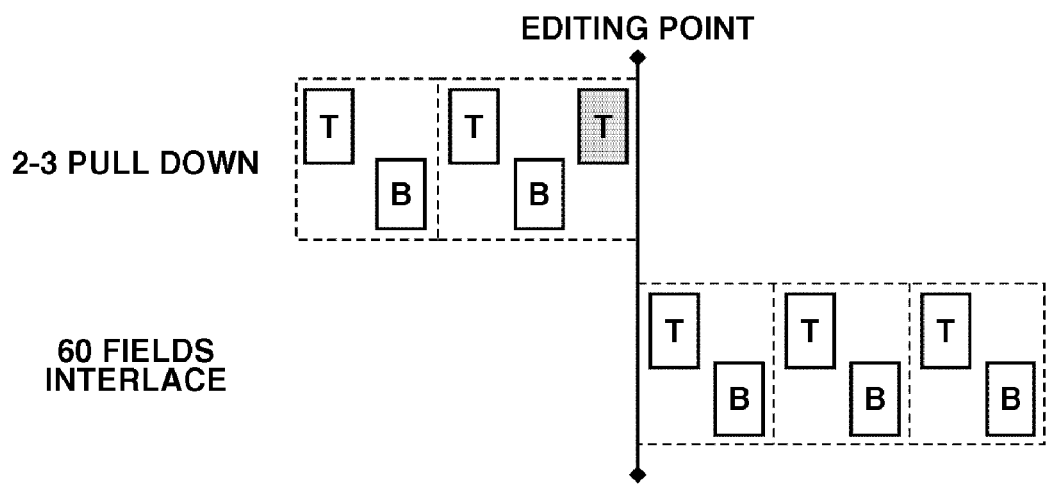
FIGS. 5A and 5B are diagrams illustrating the field order error.
Figure 5B:
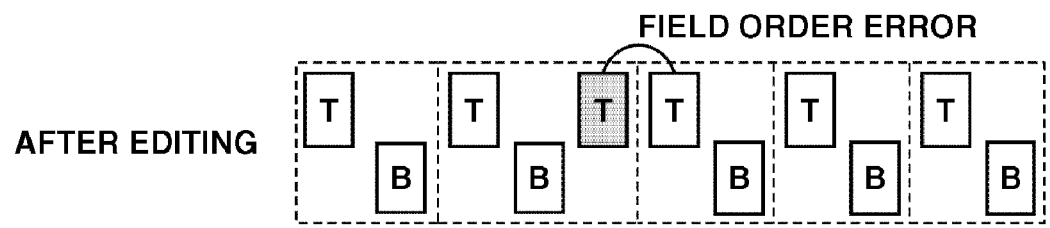

Thus, the ECC unit containing an editing point is analyzed first to find the field parity of the first frame in display order after the editing point, presence/absence of a repeat field, and the coding mode thereof. If the coding mode at the editing point is 24p, a seamless recording can be started only when the first frame in display order is top field first and information indicating presence/absence of a redundant repeat field indicates that the repeat field is present. In this way, a normal seamless recording can be performed as in the example shown in FIG. 4D.

As described above, by limiting the editing points depending on the coding mode recorded on a magnetic tape, continuous stream data without a field order error or a missing field can be generated when a seamless recording is performed. Moreover, occurrence of a decoding time, which normally does not occur, can be suppressed at editing points, and continuous stream data which can be decoded by a general decoder can be generated.

In the above-described embodiment, it is assumed that the first frame in display order of a compressed and encoded stream when starting a recording is top field first for the coding mode of 60i or 30p, and the first frame in display order of a compressed and encoded stream when starting a recording is top field first and a repeat field when starting a recording is present for the coding mode of 24p. However, the present invention is not limited to this pattern. The present invention can also be realized in the same manner when the first frame in display order of a compressed and encoded stream when starting a recording is bottom field first. In this case, only a modification to detect bottom field first in step S1204 in FIG. 12 is needed.

Second Exemplary Embodiment

Next, a second exemplary embodiment of the present invention will be described. Since the configuration of a video signal recording apparatus according to the present embodiment is similar to that described with reference to FIG. 1, the description thereof will not be repeated.

Figure 13:
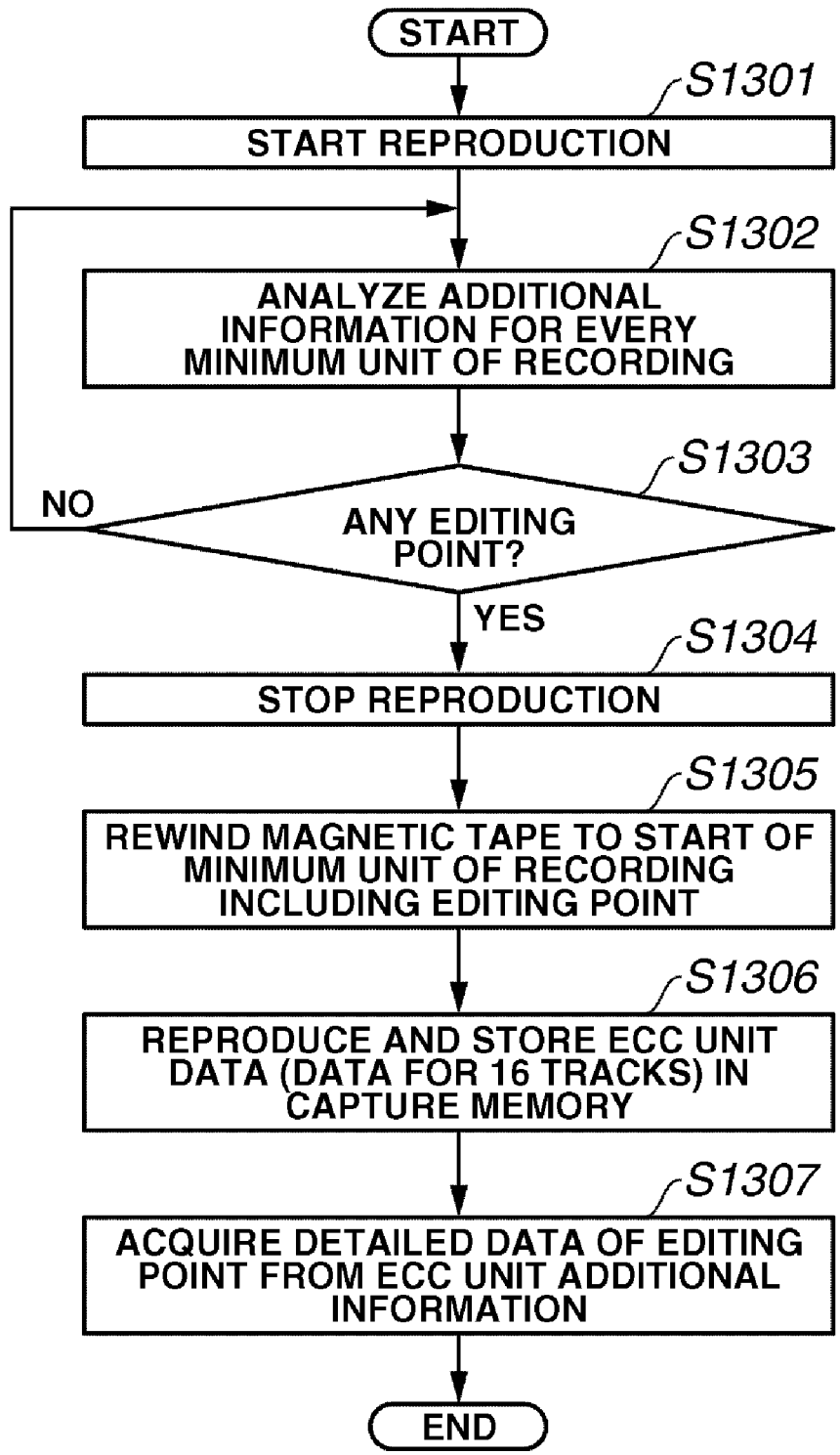
FIG. 13 is a flow chart illustrating an editing point searching according to a second exemplary embodiment of the present invention.
Figure 14:
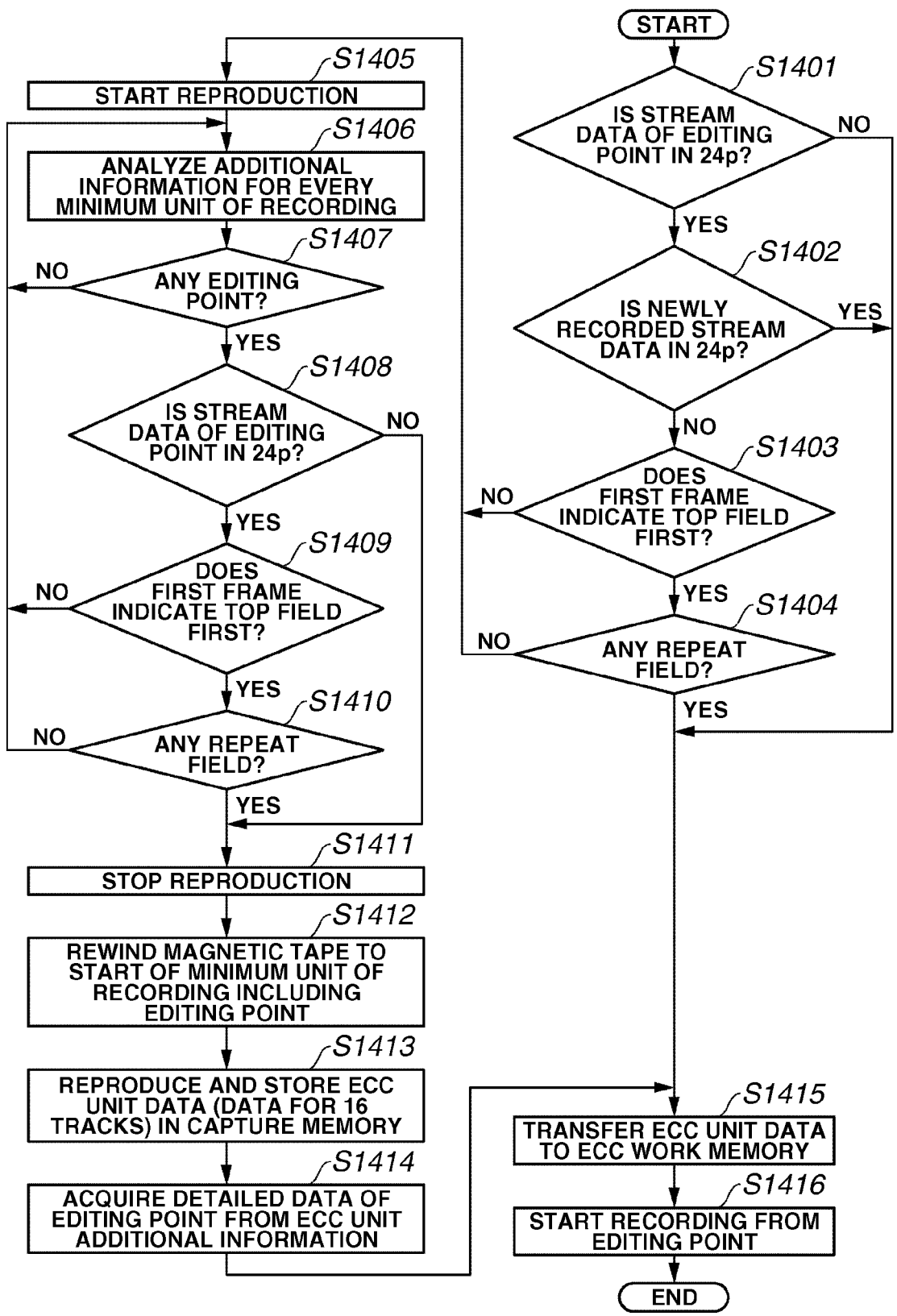
FIG. 14 is a flow chart illustrating a seamless recording according to the second embodiment of the present invention.

Referring to FIGS. 13 and 14, an exemplary operation for a seamless recording to record new recording data on a recorded magnetic tape according to the present embodiment is described below. The flow charts in FIGS. 13 and 14 illustrate exemplary operation control sequences performed by the controller 110.

In the present embodiment, new pictures can be recorded seamlessly following existing pictures while maintaining continuity of stream data. FIG. 13 is a flow chart for searching for an editing point on the magnetic tape 113, and FIG. 14 is a flow chart of recording processing started in accordance with a recording start instruction.

In FIG. 13, recorded data on the magnetic tape 113 is reproduced to search for an editing point (S1301). The controller 110 acquires data whose errors have been corrected by the error correcting unit 106 from the ECC work memory 107 and analyzes additional information for every reproduced minimum unit of recording (ECC unit) (S1302). Then, if an editing point is found to be present as a result of analyzing the ECC unit additional information (Yes in step S1303), the procedure proceeds to step S1304, and if no editing point is found (No in step S1303), the procedure returns to step S1302. After returning to step S1302, a similar flow will be repeated for the minimum unit of recording (ECC unit) to be reproduced next.

If an editing point is present, the reproduction is stopped (S1304). Then, the magnetic tape 113 is rewound to a reproduction start position of the minimum unit of recording (ECC unit) including the editing point (S1305).

The reproduction is restarted to reproduce the ECC unit (data for 16 tracks) including the editing point, data thereof is transferred from the ECC work memory 107 to the capture memory 108, and the data is stored in the capture memory 108 (S1306). Then, the controller 110 reads the ECC unit additional information from data stored in the capture memory 108 to acquire data on the track number of the editing point within the ECC unit, sync block number, DTS, PTS, VBV buffer amount, field parity of the first frame in display order, presence/absence of a repeat field for the first frame in display order, and coding mode (S1307).

The above processing may be performed automatically before an actual recording start instruction is given when, for example, a recorded magnetic tape is mounted on the present recording apparatus or a system of the recording apparatus is started by turning on the power.

In FIG. 14, when a recording instruction is given, whether the coding mode of the editing point acquired in step S1307 is 24p is determined (S1401). If the coding mode is 24p (Yes in step S1401), whether the coding mode of stream data to be newly recorded is 24p is determined (S1402). In the present embodiment, it is assumed that if the coding mode is not 24p, the coding mode is either 60i or 30p.

If the coding mode at the editing point is not 24p (No in step S1401) or the coding mode of stream data to be newly recorded is 24p (Yes in step S1402), the ECC unit data stored by the capture memory 108 in step S1306 is transferred to the ECC work memory 107 (S1415).

Similarly to the recording operation, a video signal to be input for a seamless recording is encoded by the MPEG codec 103 and accumulated in the stream buffer 105. The buffer managing unit 104 reads data accumulated in the stream buffer 105 and writes the data successively from the position corresponding to the track number and sync block number within the ECC unit stored in step S1306 within the ECC work memory 107. That is, a recording of new stream data starts from the editing point of the ECC unit within the ECC work memory 107 (S1416).

Subsequently, recording data undergoes processing for error correction by the error correcting unit 106 and modulation by the modulating/demodulating unit 109, and then is seamlessly recorded following the recorded data on the magnetic tape 113 by the recording/reproducing head 112.

If the coding mode of stream data to be newly recorded is not 24p (No in step S1402), that is, if the coding mode of pictures to be newly recorded is 60i or 30p, which is different from the coding mode at the editing point, whether the field parity of the first frame in display order after the editing point acquired in step S1307 indicates top field first is determined (S1403). If the field parity indicates top field first (Yes in step S1403), whether there is any repeat field in the first frame in display order after the editing point is determined from the additional information acquired in step S1307 (S1404). If a repeat field is present (Yes in step S1404), as described above, processing of steps S1415 and S1416 is performed.

If the field parity indicates not top field first (No in step S1403), or if the field parity indicates top field first (Yes in step S1403) and no repeat field is present (No in step S1404), the controller 110 restarts reproduction of the magnetic tape 113 (S1405), acquires data whose errors have been corrected by the error correcting unit 106 from the ECC work memory 107, and analyzes additional information for every reproduced minimum unit of recording (ECC unit) (S1406).

Then, if an editing point is found to be present (Yes in step S1407) as a result of analyzing the ECC unit additional information in step S1406, the procedure proceeds to step S1408, and if no editing point is found (No in step S1407), the procedure returns to step S1406.

If the editing point is found to be 24p (Yes in step S1408) as a result of analyzing the ECC unit additional information in step S1406, the procedure proceeds to step S1409. Otherwise (No in step S1408), the procedure proceeds to step S1411.

If the field parity of the first frame in display order after the editing point is found to indicate top field first (Yes in step S1409) as a result of analyzing the ECC unit additional information in step S1406, the procedure proceeds to step S1410. Otherwise (No in step S1409), the procedure returns to step S1406.

If information indicating presence/absence of a repeat field for the first frame in display order after the editing point indicates presence of the repeat field (Yes in step S1410) as a result of analyzing the ECC unit additional information in step S1406, the procedure proceeds to step S1411. Otherwise (No in step S1410), the procedure returns to step S1406. After returning to step S1406, a similar flow will be repeated for the minimum unit of recording (ECC unit) to be reproduced next.

The reproduction is stopped (S1411). Then, the magnetic tape 113 is rewound to a reproduction start position of the minimum unit of recording (ECC unit) including the editing point analyzed in step S1406 (S1412).

The reproduction is restarted to reproduce the ECC unit (data for 16 tracks) including the editing point, data thereof is transferred from the ECC work memory 107 to the capture memory 108, and the data is stored in the capture memory 108 (S1413). Then, the controller 110 reads the ECC unit additional information from data stored in the capture memory 108 to acquire data on the track number of the editing point within the ECC unit, sync block number, DTS, PTS, VBV buffer amount, field parity of the first frame in display order, presence/absence of a repeat field for the first frame in display order, and coding mode (S1414) After step S1414, the digital data stored in the capture memory 108 in step S1413 is transferred to the ECC work memory 107 (S1415).

By the same operation as described above, a video signal to be input for a seamless recording is encoded by the MPEG codec 103 and accumulated in the stream buffer 105. The buffer managing unit 104 reads data accumulated in the stream buffer 105 and writes the data successively from the position corresponding to the track number and sync block number within the ECC unit stored in step S1413 within the ECC work memory 107. That is, a recording of new stream data starts from the editing point of the ECC unit within the ECC work memory 107 (S1416). Subsequently, recording data undergoes processing for error correction by the error correcting unit 106 and modulation by the modulating/demodulating unit 109, and then is seamlessly recorded following the recorded data on the magnetic tape 113 by the recording/reproducing head 112.

Since, in the present embodiment, fields are connected in correct order in this manner when the coding mode is different before and after a detected editing point, a seamless recording can be performed without a field order error or a time stamp continuity error. That is, a normal seamless recording can be performed as in the example shown in FIG. 4D.

In the above description, whether the coding mode at the editing point is 24p is checked, but whether the coding mode at the editing point is 60i or 30p may also be checked. In this case, it is necessary to determine whether the field parity indicates bottom field first.

In the above description, it is assumed that a top field first frame is the first frame for 60i and 30p and a frame that is top field first and having a repeat field is the first frame for 24p. However, a bottom field first frame may be defined as the first frame for 60i and 30p and a frame that is bottom field first and having a repeat field may be defined as the first frame for 24p. For such changes, only a change to determine whether the first frame is bottom field first in steps S1403 and S1409 in FIG. 14 is needed.

Third Exemplary Embodiment

A third exemplary embodiment of the present invention will be described below. Since the configuration of a video signal recording apparatus according to the present embodiment is similar to that described with reference to FIG. 1, the description thereof will not be repeated.

Figure 15:
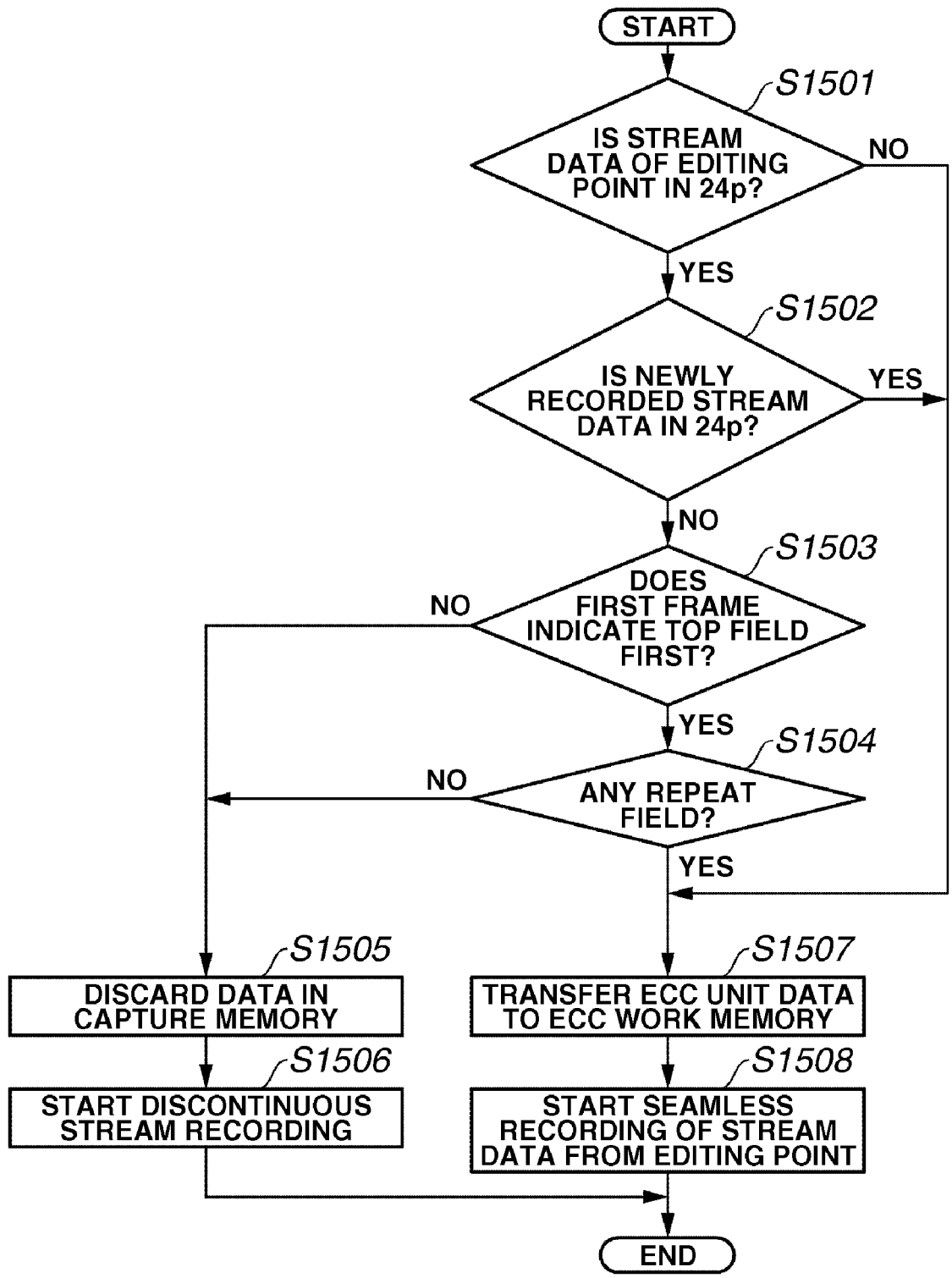
FIG. 15 is a flow chart illustrating a seamless recording according to a third embodiment of the present invention.
Figure 16:
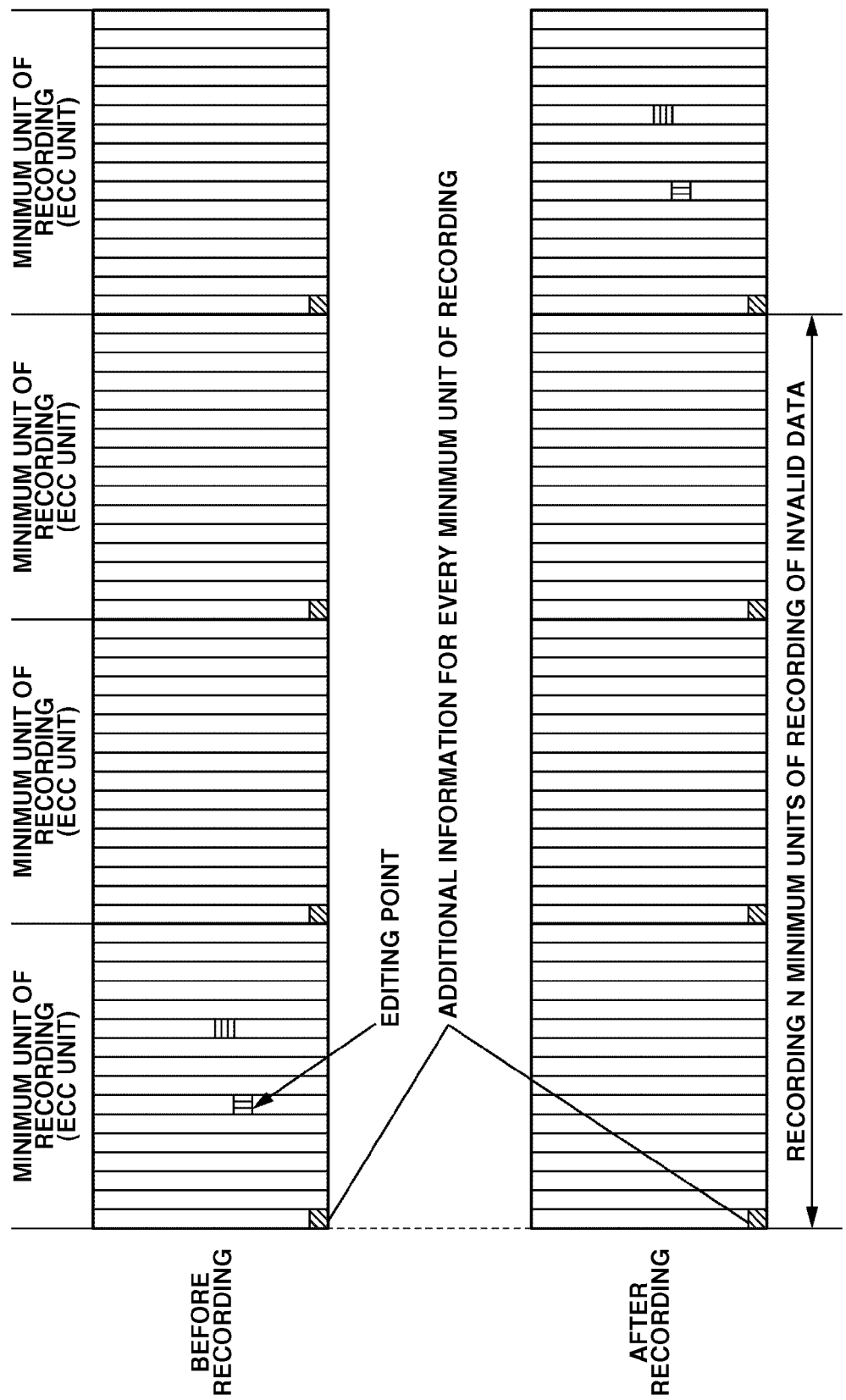
FIG. 16 is a flow chart illustrating a discontinuous stream recording according to the third embodiment of the present invention.

Then, referring to 15, and 16, an exemplary operation for a seamless recording to record new recording data on a recorded magnetic tape according to the present embodiment is described below. The flow chart in FIG. 15 illustrates an exemplary operation control sequence performed by the controller 110. Further, the flow chart in FIG. 15 is a partial modification of that shown in FIG. 14, and instead of steps S1405 to S1414 in FIG. 14, steps S1505 and S1506 are provided. FIG. 16 illustrates an example of recording on a magnetic tape before and after performing a discontinuous stream recording according to the present embodiment.

In FIG. 15, when a recording instruction is given, whether the coding mode of the editing point acquired in step S1307 in FIG. 13 is 24p is determined (S1501). If the coding mode is 24p (Yes in step S1501), whether the coding mode of stream data to be newly recorded is 24p is determined (S1502). In the present embodiment, it is assumed that if the coding mode is not 24p, the coding mode is either 60i or 30p.

If the coding mode at the editing point is not 24p (No in step S1501) or the coding mode of stream data to be newly recorded is 24p (Yes in step S1502), the ECC unit data stored by the capture memory 108 in step S1306 is transferred to the ECC work memory 107 (S1507).

Similarly to the recording operation, a video signal to be input for a seamless recording is encoded by the MPEG codec 103 and accumulated in the stream buffer 105. The buffer managing unit 104 reads data accumulated in the stream buffer 105 and writes the data successively from the position corresponding to the track number and sync block number within the ECC unit stored in step S1306 within the ECC work memory 107. That is, a recording of new stream data starts from the editing point of the ECC unit within the ECC work memory 107 (S1508).

Subsequently, recording data undergoes processing for error correction by the error correcting unit 106 and modulation by the modulating/demodulating unit 109, and then is seamlessly recorded following the recorded data on the magnetic tape 113 by the recording/reproducing head 112.

If the coding mode of stream data to be newly recorded is not 24p (No in step S1502), that is, if the coding mode of pictures to be newly recorded is 60i or 30p, which is different from the coding mode at the editing point, whether the field parity of the first frame in display order after the editing point acquired in step S1307 indicates top field first is determined (S1503). If the field parity indicates top field first (Yes in step S1503), whether there is any repeat field in the first frame in display order after the editing point is determined from the additional information acquired in step S1307 (S1504). If a repeat field is present (Yes in step S1504), as described above, processing of steps S1507 and S1508 is performed.

If the field parity indicates no top field first (No in step S1503), or if the field parity indicates top field first (Yes in S1503) and no repeat field is present in the first frame (No in step S1504), the procedure proceeds to step S1505.

Subsequently, stored content in the capture memory 108 is discarded (S1505) and a discontinuous stream recording is started (S1506). That is, in this state, a seamless recording to create continuous stream data is quit and a discontinuous stream recording is carried out.

Here, referring to FIG. 16, a discontinuous stream recording will be described. When an instruction to start a discontinuous stream recording is given by the controller 110, the buffer managing unit 104 transfers invalid data for an ECC unit to the ECC work memory 107. At the same time, signals from the VIDEO IN/OUT terminal 101 and the AUDIO IN/OUT terminal 102 are compressed and encoded by the MPEG codec 103, and an MPEG stream starts to be accumulated in the stream buffer 105. When data for the ECC unit is accumulated in the ECC work memory 107, the error correcting unit 106 reads the data for the ECC unit from the ECC work memory 107, performs error correction processing, and writes the data back to the ECC work memory 107. When data for which error correction processing has been performed by the error correcting unit 106 is accumulated in the ECC work memory 107, the modulating/demodulating unit 109 reads N (for example, five) ECC units of invalid data from the ECC work memory 107, modulates the invalid data, and records the data on the magnetic tape 113.

When transfer and recording of the N ECC units of invalid data is completed, the buffer managing unit 104 sequentially transfers the MPEG stream accumulated in the stream buffer 105 for the ECC unit to the ECC work memory 107. Then, the recording processing as described above is performed.

In this manner, in the present embodiment, when the coding mode is different before and after an editing point, a new video signal can be recorded continuously after inserting and recording invalid data.

Fourth Exemplary Embodiment

A fourth exemplary embodiment of the present invention will now be described below. Since the configuration of a video signal recording apparatus according to the present embodiment is similar to that described with reference to FIG. 1, the description thereof will not be repeated.

Figure 17:
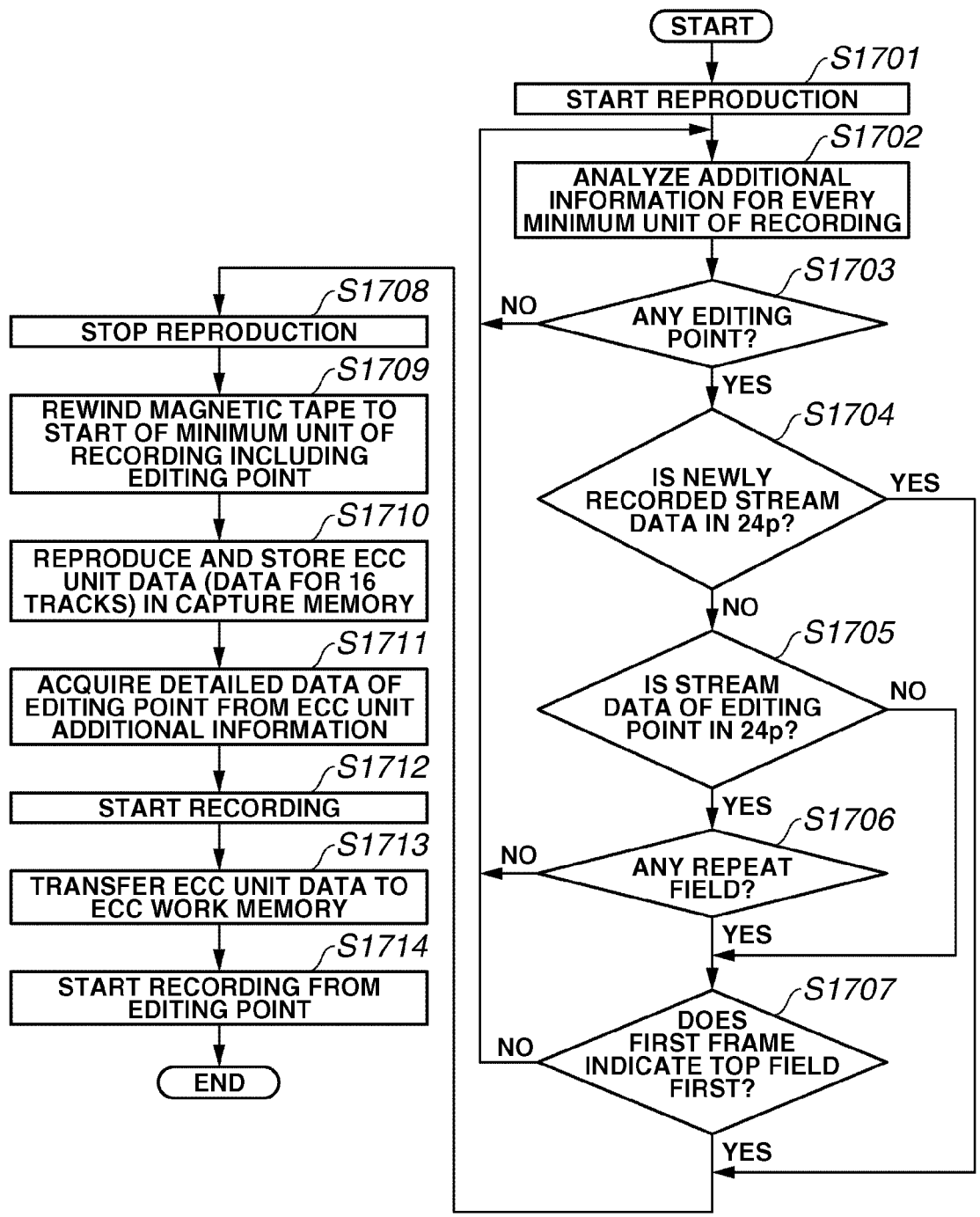
FIG. 17 is a flow chart illustrating a seamless recording according to a fourth embodiment of the present invention.

Referring to FIG. 17, an exemplary operation for a seamless recording to record new recording data on a recorded magnetic tape according to the present embodiment is described below. In particular, a method of detecting an editing point appropriate for a seamless recording will be described with reference to FIG. 17. Further, the flow chart in FIG. 17 illustrates an operation control sequence performed by the controller 110.

In FIG. 17, recorded data on the magnetic tape 113 is reproduced to search for an editing point (S1701). The controller 110 acquires data whose errors have been corrected by the error correcting unit 106 from the ECC work memory 107 and analyzes additional information for every reproduced minimum unit of recording (ECC unit) (S1702). Then, if an editing point is found to be present (Yes in step S1703) as a result of analyzing the ECC unit additional information, the procedure proceeds to step S1704. If no editing point is found (No in step S1703), the procedure returns to step S1702.

Whether the coding mode of stream data to be newly recorded is 24p is determined (S1704). In step S1704, if the coding mode of stream data to be newly recorded is 24p, the procedure proceeds to step S1708. Otherwise (No in step S1704), the procedure proceeds to step S1705. In the present embodiment, it is assumed that if the coding mode is not 24p, the coding mode is either 60i or 30p.

If stream data of the editing point is found to be 24p (Yes in step S1705) as a result of analyzing the ECC unit additional information, the procedure proceeds to step S1706. Otherwise (No in step S1705), the procedure proceeds to S1707.

If information indicating presence/absence of a repeat field for the first frame in display order after the editing point indicates presence of the repeat field (Yes in step S1706) as a result of analyzing the ECC unit additional information, the procedure proceeds to step S1707. Otherwise (No in step S1706), the procedure returns to step S1702.

If the field parity of the first frame in display order after the editing point is found to indicate top field first (Yes in step S1707) as a result of analyzing the ECC unit additional information, the procedure proceeds to step S1708. Otherwise (No in step S1707), the procedure returns to step S1702. After returning to step S1702, a similar flow will be repeated for the minimum unit of recording (ECC unit) to be reproduced next.

Thus, if the coding mode of pictures to be newly recorded is 24p (Yes in step S1704), the editing point detected first is adopted. If the coding mode of pictures to be newly recorded is 60i or 30p (No in step S1704) and the coding mode of recorded pictures is 24p (Yes in step S1705), the editing point is adopted if the first frame in display order of recorded pictures has a repeat field (Yes in step S1706) and the field parity indicates top field first (Yes in step S1707). If either of the conditions in step S1706 and S1707 is not satisfied, another editing point is searched.

Further, if the coding mode of pictures to be newly recorded is 60i or 30p (No in step S1704) and the coding mode of recorded pictures is 60i or 30p (No in step S1705), the editing point is adopted if the field parity of the first frame in display order of recorded pictures indicates top field first (Yes in step S1707). If not top field first (No in step S1707), another editing point is searched.

Still referring to FIG. 17, next, the reproduction is stopped (S1708). Then, the magnetic tape 113 is rewound to a reproduction start position of the minimum unit of recording (ECC unit) including the editing point (S1709).

The reproduction is restarted to reproduce the ECC unit (data for 16 tracks) including the editing point, data thereof is transferred from the ECC work memory 107 to the capture memory 108, and the data is stored in the capture memory 108 (S1710). Then, the controller 110 reads the ECC unit additional information from data stored in the capture memory 108 to acquire data on the track number of the editing point within the ECC unit, sync block number, DTS, PTS, VBV buffer amount, field parity of the first frame in display order, presence/absence of a redundant repeat field for the first frame in display order, and coding mode (S1711).

It is noted that steps S1701 through S1711 may be performed automatically before an actual recording start instruction is given when, for example, a recorded magnetic tape is mounted on the present recording apparatus or a system of the recording apparatus is started by turning on the power.

Next, the recording is started in accordance with a recording instruction (S1712). Then, ECC unit data stored in the capture memory 108 is transferred to the ECC work memory 107 (S1713).

Similarly to the recording operation, a video signal to be input for a seamless recording is encoded by the MPEG codec 103 and accumulated in the stream buffer 105. The buffer managing unit 104 reads data accumulated in the stream buffer 105 and writes the data successively from the position corresponding to the track number and sync block number within the ECC unit stored in step S1710 within the ECC work memory 107. That is, a recording of new stream data starts from the editing point of the ECC unit within the ECC work memory 107 (S1714).

Subsequently, recording data undergoes processing for error correction by the error correcting unit 106 and modulation by the modulating/demodulating unit 109, and then is seamlessly recorded following the recorded data on the magnetic tape 113 by the recording/reproducing head 112. In this manner, a normal seamless recording can be performed as in the example shown in FIG. 4D.

In the above description, whether the coding mode at the editing point is 24p is checked, but whether the coding mode at the editing point is 60i or 30p may also be checked. In this case, it is necessary to determine whether the field parity indicates bottom field first. In this manner, in the present embodiment, an editing point appropriate for a seamless recording can be detected, and then a seamless recording can be performed from the detected editing point.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2005-259461 filed Sep. 7, 2005, No. 2005-259533 filed Sep. 7, 2005, and No. 2005-259534 filed Sep. 7, 2005, which are hereby incorporated by reference herein in their entirety.

What is claimed is:

1. A video signal recording apparatus configured to record, on a tape-shaped recording medium, unit data obtained by unitizing stream data based on an error correction processing unit, the apparatus comprising:
   a recording unit configured to embed, at a certain position in the unit data, an editing point indicating a seamless recording point that is set at a certain frame interval, and record the unit data on the recording medium;
   a reproduction unit configured to reproduce a video signal including the unit data from the recording medium;
   a memory unit configured to store the unit data reproduced from the recording medium to perform an error correction process;
   a detecting unit configured to detect the editing point included in the unit data reproduced from the recording medium, in accordance with system data that exists for each item of the unit data;
   an analyzing unit configured to analyze the system data and the editing point detected by the detecting unit and obtain information indicating a video mode at the editing point, field order, and presence/absence of a repeat field; and
   a seamless recording control unit configured to control a seamless recording for recording, on the recording medium on which unit data including first stream data has been recorded, unit data including second stream data,
   wherein, when performing the seamless recording, the seamless recording control unit reproduces the unit data including the first stream data from the recording medium by operating the reproduction unit and determines whether an editing point in the reproduced unit data is suitable for the seamless recording of the second stream data based on the information obtained by the analyzing unit, and if the editing point in the reproduced unit data is not suitable for the seamless recording of the second stream data, the seamless recording control unit repeats operations of reproduction of another unit data including the first stream data from the recording medium, detection by the detecting unit and analysis by the analyzing unit, and if the editing point in the reproduced unit data is suitable for the seamless recording of the second stream data, the seamless recording control unit starts the seamless recording of the second stream data from the editing point within the unit data stored in the memory unit and seamlessly records the unit data stored in the memory unit onto the recording medium following the unit data including the first stream data.

2. The apparatus according to claim 1, wherein the seamless recording control unit searches for an editing point that becomes seamlessly recordable from a top field first frame when the video mode of the first stream data is one of a 60 fields/second interlaced mode and a 30 frames/second progressive mode, and
   wherein the seamless recording control unit searches for an editing point that becomes seamlessly recordable from a top field first frame having a repeat field when the video mode of the first stream data is a 24 frames/second progressive mode.

3. The apparatus according to claim 1, wherein the seamless recording control unit searches for an editing point that becomes seamlessly recordable from a bottom field first frame when the video mode of the first stream data is one of a 60 fields/second interlaced mode and a 30 frames/second progressive mode, and
   wherein the seamless recording control unit searches for an editing point that becomes seamlessly recordable from a bottom field first frame having a repeat field when the video mode of the first stream data is a 24 frames/second progressive mode.

4. The apparatus according to claim 1, wherein the unit data is a minimum unit of recording on the recording medium, and wherein the recording unit records the unit data on a predetermined number of tracks formed continuously on the recording medium.

5. The apparatus according to claim 1, wherein the memory unit performs a seamless recording process from the first stream data to the second stream data within the unit data stored in the memory unit.

* * * * *